United States Patent
Jackson et al.

(10) Patent No.: US 12,511,188 B2
(45) Date of Patent: Dec. 30, 2025

(54) PROVIDING RESOLUTIONS TO UNKNOWN COMPUTATIONAL ERRORS VIA CONTEXT-BASED HISTORICALLY DERIVED RESOLUTIONS TO KNOWN ERRORS SYSTEMS AND METHODS

(71) Applicant: Capital One Services, LLC, McLean, VA (US)

(72) Inventors: Paul George Jackson, Nottingham (GB); Sunny Au, Nottingham (GB); Andrew James Marriott, Nottingham (GB); Josh Harvey Torbett, Nottingham (GB); Gavin Wilkinson, Nottingham (GB); Christian Oliver Webb, Nottingham (GB); Yidi Tang, Nottingham (GB); Daryl Oliver Jude Cecile, Nottingham (GB)

(73) Assignee: Capital One Services, LLC, McLean, VA (US)

( * ) Notice: Subject to any disclaimer, the term of this patent is extended or adjusted under 35 U.S.C. 154(b) by 45 days.

(21) Appl. No.: 18/492,862

(22) Filed: Oct. 24, 2023

(65) Prior Publication Data

US 2025/0130885 A1     Apr. 24, 2025

(51) Int. Cl.
*G06F 11/00* (2006.01)
*G06F 8/71* (2018.01)
(Continued)

(52) U.S. Cl.
CPC ............ *G06F 11/0793* (2013.01); *G06F 8/71* (2013.01); *G06F 11/3698* (2025.01)

(58) Field of Classification Search
CPC ............ G06F 11/0793; G06F 11/3698; G06F 11/079; G06F 11/0787
See application file for complete search history.

(56) References Cited

U.S. PATENT DOCUMENTS

2009/0158099 A1\* 6/2009 Cui ................ G06F 11/0778
                                                          714/57
2020/0097389 A1    3/2020 Smith et al.
(Continued)

OTHER PUBLICATIONS

Extended European Search Report on EP Appl. Ser. No. 24206243.8 Dated Feb. 14, 2025 (15 pages).

Primary Examiner — Katherine Lin
(74) Attorney, Agent, or Firm — Foley & Lardner LLP

(57) ABSTRACT

Reducing utilization of computational resources associated with providing predictions of resolutions to unknown computational errors via context-based historically derived resolutions to known errors may be facilitated. In some embodiments, update-information associated with an automation pipeline feature indicating an error may be received by a system. Based on the update-information, the system determines a context associated with the automation pipeline feature. The system may then determine that the error is associated with an update to a third-party software-development platform. The system may receive a set of messages from the third-party software-development platform indicating source code file-related information. The system may provide the context and the set of messages indicating source code file-related information to a machine learning model to generate a prediction indicating a resolution to the error. The system may then transmit the prediction indicating the resolution to the error to a software-module application installed on a remote device.

20 Claims, 7 Drawing Sheets

(51) Int. Cl.
    *G06F 11/07*      (2006.01)
    *G06F 11/3698*   (2025.01)

(56)           References Cited

U.S. PATENT DOCUMENTS

| | | |
|---|---|---|
| 2020/0110693 A1 | 4/2020 | Herrin et al. |
| 2022/0398308 A1* | 12/2022 | Zerah ...................... G06F 21/52 |
| 2023/0153459 A1 | 5/2023 | Sharma et al. |
| 2024/0078172 A1* | 3/2024 | Duggal ............... G06F 11/3696 |

* cited by examiner

500c

Platform ▷ ukcard ▷ Bogie ▷ UK-Trigger ▷ module ▷ PR-30 ▷ #6

[Pipeline] {  ← 516
[Pipeline] sh
17:09:31 + exho 'awa s3 cp –ase AES256 . S3://cap-devtools-hazpr-ouw2-test/--
17:09:31 + chmod +c s3.sh
17:09:31 + AWS_REGION=eu-west-2
17:09:31 + AWS_ROLE_SESSION_NAME=bogie
17:09:31 + AWS_ROLE_ARN=arn:aws:iam:5432892453:role/cap-CustomRole-plat
17:09:31 + awssuze ./s3.sh
17:09:31 + Completed 1921 Bytes/192 Bytes (401 Bytes/s) with 1 file remaining
Upload: ./s3.sh to s3://cap-devtools-hazpr-ouw2-test/--
17:09:31 + rm s3.sh
[Pipeline] }
[Pipeline] // dir
[Pipeline] }
[Pipeline] // withCredentials
[Pipeline] }

514

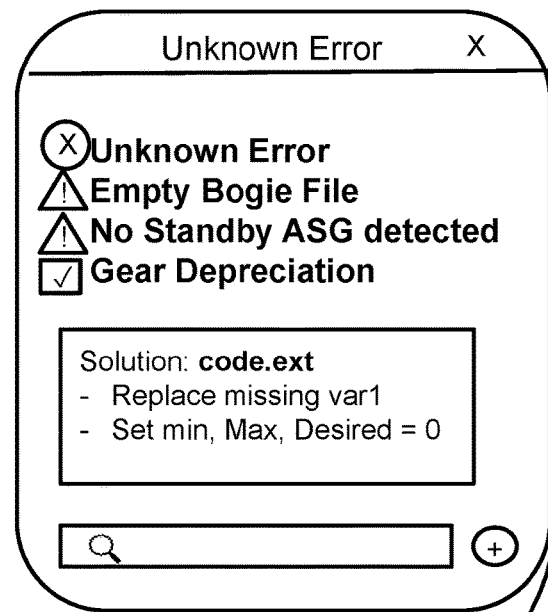

FIG. 5C

PROVIDING RESOLUTIONS TO UNKNOWN COMPUTATIONAL ERRORS VIA CONTEXT-BASED HISTORICALLY DERIVED RESOLUTIONS TO KNOWN ERRORS SYSTEMS AND METHODS

BACKGROUND

As software applications continue to increase in complexity, so do the errors associated with developing such software applications. Software developers often face many hurdles when attempting to resolve errors due to the complex nature of these software applications, such as the involvement of multiple code libraries and multiple functions/methods relying on the output of another function/method. Although integrated development environments (IDE) may help a software developer develop a software application, such IDEs are limited to mere compilation/runtime error detection as opposed to identifying and resolving complex errors, whether known or unknown.

SUMMARY

Methods and systems are described herein for novel uses and/or improvements to providing predictions of resolutions to unknown computational errors. As one example, methods and systems are described herein for reducing utilization of computational resources associated with providing predictions of resolutions to unknown computational errors via context-based historically derived resolutions to known errors.

Existing software development tools are often client-side software applications installed on a user device (e.g., client device). For example, to detect errors that may be associated with a code file, IDEs are installed on the user device and may compile code or detect syntax errors, compilation errors, or other runtime errors. While detecting errors locally on the user device may be advantageous since users have full control over their software application, as software applications grow larger in size and involve multiple systems, such as in continuous integration and continuous deployment (CI/CD) environments, the amount of computer processing power and computer memory required to compile and deploy software applications also increase. While user devices are limited to how much processing power or computer memory is available, detecting errors and deploying complex software applications become a cumbersome task, taxing the user device where other computing resources could otherwise be expended more efficiently.

While detecting when an error occurs may be helpful to a software developer (e.g., a developer), IDEs are limited to this and do not provide a solution (or resolution) to the given error. This leads to a poor user experience since the developer is required to spend precious time and energy researching potential solutions to a given error. However, this is only the case when a detected error is known. For example, due to the ever-increasing complexity of software applications, such as in CI/CD environments that involve multiple systems or platforms, errors that have not occurred in the past or are altogether unknown may occur. Not only are existing software development tools limited to detecting common or reoccurring errors as opposed to unknown errors, but they also fail to provide any potential solutions or resolutions to such errors.

Moreover, even when existing software development tools provide a mundane resolution to an error (e.g., add a semi-colon to the end of a given line of code), such resolutions to the errors are not keyed to a particular context in which the error occurs, which may mislead or not resolve the underlying error at hand. For instance, an error may occur with respect to one platform, computing language, or domain, and another error that is labeled the same (or is similar to another error) may occur with respect to a different platform, computing language, or domain. Where the errors are similar to one another, providing a potential resolution to the error may be difficult as each error may be unique to a respective domain. That is, although the errors may be similar across differing platforms or systems, the solutions to such errors may be vastly different. Hence, with existing software development tools lacking the feature of providing a resolution to an unknown error or providing resolutions to errors that are associated with a particular context, users must simply guess as to which "solution" may fix a presented error. This may lead to an increased amount of computer memory, processing, and computer network traffic being utilized as the user must recompile code over and over again perform research (e.g., via the Internet) to find a potential resolution to the error.

To overcome these technical deficiencies, methods and systems disclosed herein provide a mechanism for reducing utilization of local computational resources associated with providing predictions of resolutions to unknown computational errors via context-based historically derived resolutions to known errors. For instance, by first determining a context to which an unknown error is related and determining whether one or more source code files have been updated in relation to the error, a machine learning model (trained on context-based historically derived resolutions to errors) may be provided with specific information to generate more accurate predictions. Furthermore, by generating the prediction at a remote server and transmitting the prediction to a software-module application installed on a client device (e.g., a software developer's user device), the system may further reduce the amount of computational resources experienced at the client device by offloading the computationally heavy process of machine learning-related operations to the server. Accordingly, the methods and systems provide a unique solution to providing resolutions to unknown errors via context-based historically derived resolutions to errors while reducing the amount of computational resources required to provide resolutions to unknown errors.

For example, the system may receive a message indicating update-information associated with an automation pipeline feature indicating an unknown error related to the automation pipeline feature. The system may identify an identifier of the automation pipeline feature using the update-information and determine that the unknown error is associated with an update to a source code file stored in a software-version-controlled repository, thereby providing a context in which the unknown error is occurring. By providing contextual information, such as the update-information, an identifier of the automation pipeline feature, and the source code file to a machine learning model trained on context-based historically derived resolutions to errors, the system may generate a prediction indicating a resolution to the unknown error. In this way, the system may provide robust, contextually accurate resolutions to unknown errors based on historically derived resolutions to errors that are keyed to given contexts in which they occur. Additionally, the system may transmit a message including the resolution to the unknown error to a remote client device to enable a software developer to view the resolution to the error while not only improving the user experience but also offloading computationally heavy machine learning model processing operations to a server as opposed to the client device.

In some aspects, the system may receive update-information associated with an automation pipeline feature of a software-development automation service platform, where the update-information indicates an error related to the automation pipeline feature. Based on the update-information, the system may determine a context associated with the automation pipeline feature. The system may determine, based on the error, that the error is associated with an update to a third-party software-development platform that is associated with the software-development automation service platform. The system may receive from the third-party software-development platform a set of messages indicating source code file-related information. The system may provide (i) the context associated with the automation pipeline feature and (ii) the set of messages indicating the source-code-file-related information to a machine learning model to generate a prediction indicating a resolution to the error. The system may then transmit to a software-module application installed on a remote client device the prediction indicating the resolution to the error.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIGS. 5A-5C shows illustrative examples of a user interface involved with providing predictions of resolutions to unknown computational errors, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
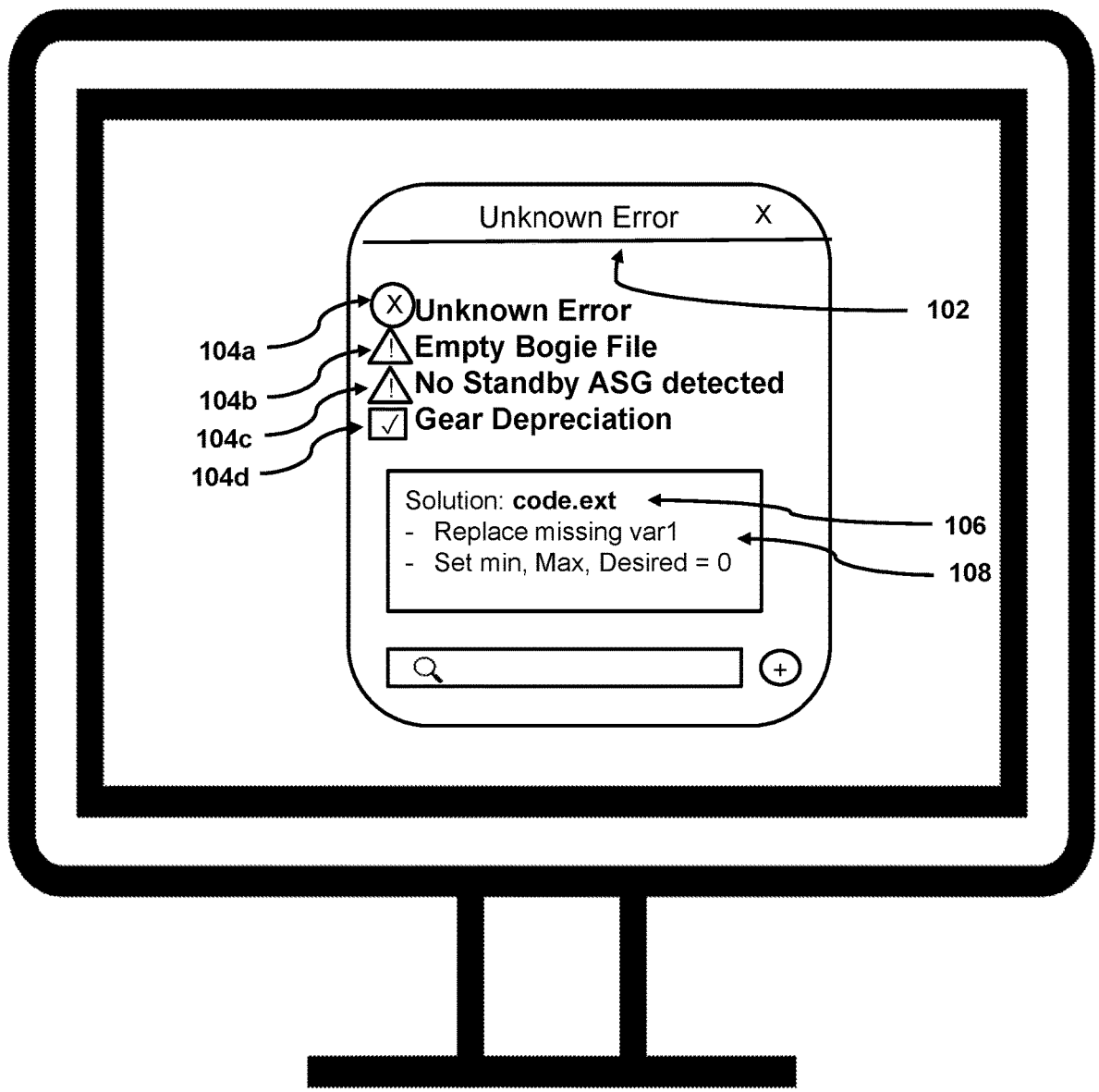
FIG. 1 shows an illustrative diagram for providing predictions of resolutions to unknown computational errors, in accordance with one or more embodiments.

FIG. 1 shows an illustrative diagram for providing predictions of resolutions to unknown computational errors, in accordance with one or more embodiments. For example, user interface 100 may indicate error 102, related errors 104a-104d, interactive link 106 associated with the error, and resolution 108 to the error. For example, the system may provide user interface 100 to enable software developers and other like users to be provided with context-based historically derived resolutions to errors to resolve one or more unknown errors.

Due to the ever-increasing complexity of software applications, developing such applications may involve multiple systems, platforms, code libraries, or the like. For example, in the context of CI/CD environments, software-development automation service platforms may connect multiple platforms/systems together, enabling software developers to monitor or develop a software application. Although such platforms/systems may be interconnected, errors while developing the software application may occur. For example, due to multiple systems being connected to one another, when an error occurs on one platform/system, it may be masked, hidden, or otherwise resemble another error that may affect another platform/system. As such, software-development automation service platforms (or other platforms involved in developing a software application) may provide an indication of an unknown error.

While the indication of an unknown error may indicate to a software developer that a problem exists within the software application, such indications are inadequate for solving the given problem. Without a given context as to where the error may be occurring, or where to start, software developers waste time researching potential solutions to the error and waste valuable computational resources (e.g., computer processing and memory resources) that could otherwise be expended on other tasks, such as editing the code related to the software application. Moreover, network traffic across one or more computing networks may be unnecessarily increased as the software developer may perform arduous research attempting to resolve an error that may be unrelated to the underlying error at hand. To resolve such issues, user interface 100 may be provided to provide context-based historically derived resolutions to errors, thereby enabling software developers to efficiently and effectively develop error-free software applications.

For instance, where error 102 is an unknown error, the system may provide information related to other known errors that may be causing the error 102, such as related errors 104a-104d, information associated with related errors 104a-104d, update-information related to one or more platforms associated with a software-development automation service platform, or other information to provide a context in which the error 102 may be occurring. User interface 100 may be provided on a remote client device (e.g., a remote user device) while a remote system (e.g., a back-end system) that is remote from the client device uses a machine learning model trained on context-based historically derived resolutions to the errors to provide predictions indicating resolutions to errors. Such resolutions to the errors and other error-related information may be transmitted to the client device to offload computationally expensive and heavy tasks when providing resolutions to errors. Not only may the system provide an integrated environment for displaying computational errors associated with developing software applications, but also may provide resolutions to one or more errors (whether known or unknown) in a single user interface. As such, the system may provide predictions of resolutions to unknown computational errors, thereby improving the user experience while reducing the amount of local computational resources associated with predicting resolutions to errors.

The system may be used to provide predictions related to resolving errors via a user interface. In disclosed embodiments, a user interface may comprise a human-computer interaction and communication in a device and may include display screens, keyboards, a mouse, and the appearance of a desktop. For example, a user interface may comprise a way a user interacts with an application of a website. In some embodiments, a user interface may be associated with a website or uniform resource locator (URL). For example, a website (or a software-module application, such as a plug-in) may provide a user interface to enable a user to interact with the website. The user interface may be part of the front end of a computing system that is connected to a back end of the computing system (e.g., servers, databases, or other back-end computing components). In some embodiments, the user interface may be configured to present content to a user.

In disclosed embodiments, content should be understood to mean an electronically consumable user asset, such as Internet content (e.g., streaming content, downloadable content, webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but it can also be part of a live performance. Furthermore, user-generated content may include content created and/or consumed by a user. For example, user-generated content may include content created by another but consumed and/or published by the user. Content may also refer to messages, texts, images, status updates, notifications, errors, unknown errors, source-code-file-related information (e.g., source code files, source code file updates, changes to source code files), or other content associated with one or more aspects of software development. For example, content associated with one or more aspects of software development may include updates to source code files, a status of a given software application, workflow pipeline information associated with a software application development, update-information associated with an automation pipeline feature (e.g., information pertaining to the current or prior statuses of a build, current or prior statuses of a given job), indications of errors, interactive links of errors (e.g., hyperlinks to sources of errors, hyperlinks to resolutions to errors, hyperlinks to source code files), or other software-development-related content, in accordance with one or more embodiments.

The system may be used to provide predictions related to resolving errors using information from remote computer networks. In disclosed embodiments, a remote computer network may be any computing system that is remote from another computing system. In some embodiments, a remote computing network may be a server that is communicatively connected to a database that is remote from a main computing system. For example, the main computing system may be a system that integrates remotely retrieved information from one or more remote computer networks, where the one or more remote computer networks are not part of the main computing system (e.g., the remote computer networks are accessible over an application programming interface (API), the Internet, or one or more other computing networks). In some embodiments, the remote computer network may be a computer network that is not physically accessible by a user. For example, a remote computer network may be a computer network that is located in a different location than that of the computing system of the user.

The system may use APIs to enable a software application or a software-module application installed on a client device to exchange data with one or more servers. In disclosed embodiments, the API may comprise a way for two or more computer programs to communicate with each other. In some embodiments, the API may comprise an interface that services other pieces of software. For example, an API may connect two software applications together to enable the software applications to interact with one another based on a set of definitions or protocols. In some embodiments, the API may comprise a web API that enables communication between computers that are connected via the Internet. In some embodiments, the API may comprise a remote API. In some embodiments, the API may be a synchronous API, which may be installed on a client device (e.g., a user device or a mobile device) to enable a software application to exchange data with one or more servers in a synchronous request-response pattern, which allows a call site to be blocked while waiting for the request-related code to finish executing prior to receiving a response. In some embodiments, the API may be an asynchronous API, which may be installed on a client device to enable a software application to exchange data with one or more servers in an asynchronous request-response pattern, which allows a call site to remain open (e.g., not blocked) while waiting for the request-related code to finish executing, thereby enabling a response to be received by the API prior to the request-related code finishing execution.

Figure 2:
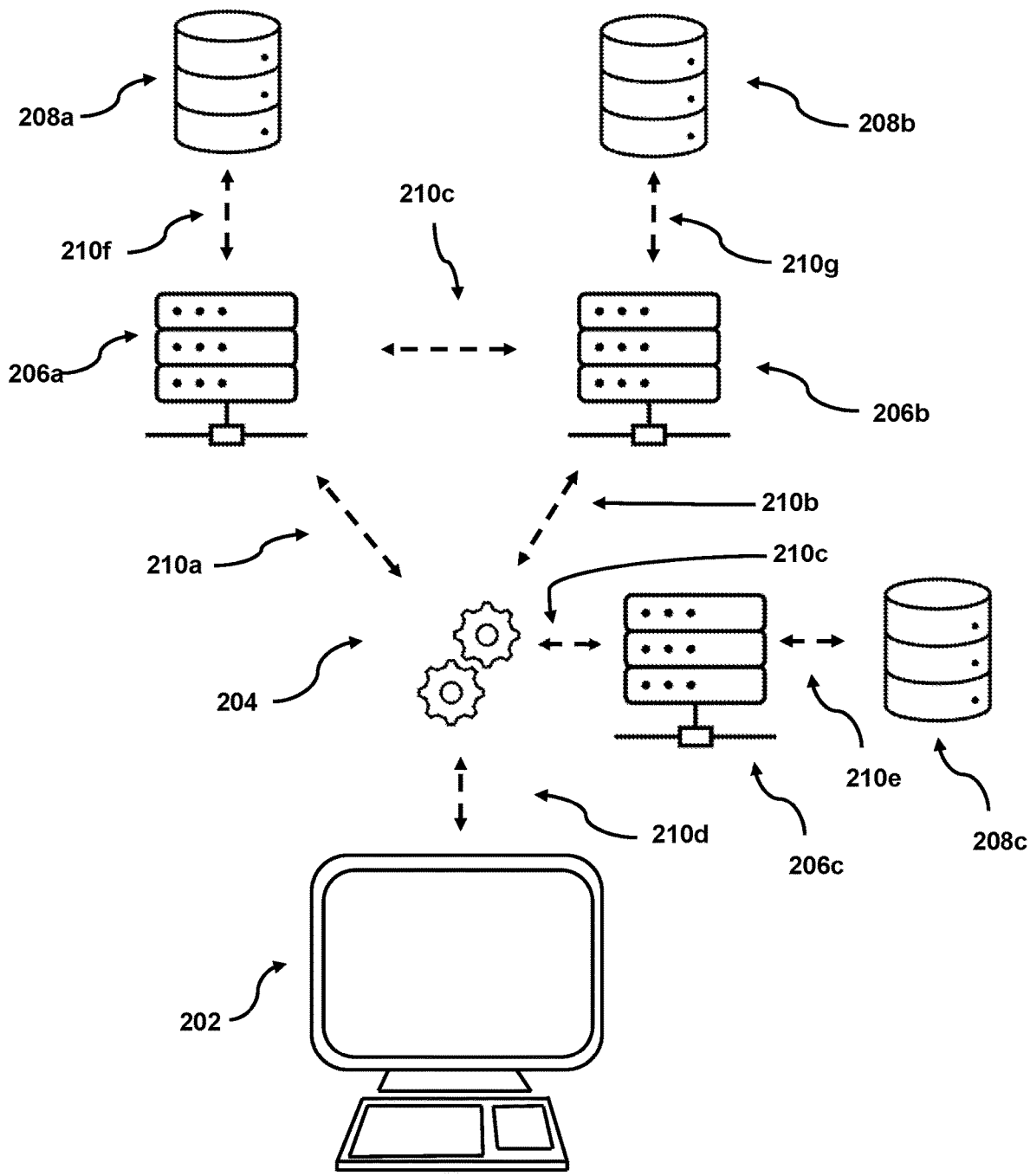
FIG. 2 shows an illustrative diagram for reducing utilization of computational resources associated with providing predictions of resolutions to unknown computational errors via context-based historically derived resolutions to known errors, in accordance with one or more embodiments.

FIG. 2 shows an illustrative diagram for reducing utilization of computational resources associated with providing predictions of resolutions to unknown computational errors via context-based historically derived resolutions to known errors, in accordance with one or more embodiments. For example, FIG. 2 shows diagram 200 indicating a client device 202 interacting with API 204 to retrieve predictions of resolutions to unknown computational errors. Each of the components in diagram 200 may communicate via communication links 210a-210g. In some embodiments, first server 206a, second server 206b, and third server 206c may be remote from client device 202, and each of first server 206a, second server 206b, and third server 206c may be associated with respective computing networks that are remote from one another. For example, first server 206a may be associated with a first software-development platform (e.g., a software-version-controlled repository), second server 206b may be associated with a second software-development platform (e.g., a software-development automation service platform), and third server 206c may be associated with a third software-development platform (e.g., a software error processing platform or application). In some embodiments, API 204 may interact with each of first server 206a, second server 206b, or third server 206c to provide predictions of resolutions to unknown computational errors. As opposed to existing systems' reliance on local processing of error-related information when developing software applications, the system may offload computationally expensive processes to remote servers while enabling users (e.g., software developers) to be provided with context-rich resolutions to unknown errors while reducing the amount of local computational resources expended by client devices.

In some embodiments, a software-module application may be installed on, hosted by, or part of any one of servers 206a-206c. For instance, the software-module application may be a computer program such as a plug-in application installed on second server 206b. The software-module application may be a software application that fetches content from the World Wide Web, local storage, or servers 206a-206c and displays such content on client device 202. As an example, the software-module application may generate for display user interface 100 (FIG. 1) and may provide user interface 100 to another software-module application hosted on another device. For example, in some embodiments, another software-module application may be installed on, hosted by, or part of a software application of client device 202. As an example, the software application may be a web browsing application installed on client device 202 and the software-module application may be a sub-application or a module-based application that may manage, control, or process information that the software application cannot manage, control, or process. For instance, the other software-module application may be a web browser plug-in that is configured to receive information from the software-module application installed on second server 206b to display one or more user interfaces to a user of client device 202.

In some embodiments, the software-module application (or the other software-module application) may include one or more monitoring functions. For example, the monitoring function may monitor messages, requests, responses, calls, or other information that flows between one or more components of diagram 200. For instance, the monitoring function may be a webhook, and the first server 206a, second server 206b, and third server 206c may each be associated with an API. For example, a webhook may enable communication between APIs, such as API 204. In some embodiments, webhooks receive information to and from the APIs to which they are connected and may be used to trigger various automations, processes, functions, or other events.

As shown in FIG. 2, each of first server 206a, second server 206b, and third server 206c may be associated with a database, such as first database 208a, second database 208b, and third database 208c, respectively. Each of the databases may be able to communicate with one or more components of diagram 200, such as via communication links 210a-210g. As an example, communication links 210a-210g may be communication pathways to enable an exchange of data between one or more components of FIG. 2, such as a wired or wireless network connection. In some embodiments, client device 202 may communicate with a third server 206c via communication link 212c.

In one use case, to reduce utilization of computational resources associated with providing predictions of resolutions to unknown computational errors via context-based historically derived resolutions to known errors, computationally expensive processes may be offloaded from client device 202 to other components of diagram 200. For example, first server 206a may be a third-party software-version-controlled repository, second server 206b may be software-development automation service platform, and third server 206c may be a software error processing platform. The software-version-controlled repository may be a repository for storing one or more source code files related to a software application that indicates different versions of a source code file. For example, each source code file stored in the software-version-controlled repository may indicate a versioning identifier (e.g., a numerical value, alphanumerical value, string, text, or other value to indicate a version of a given source code file). The software-version-controlled repository may provide messages indicating source code file-related information such as updates to the source code files (e.g., an indication that a code file has been updated, a date/time a code file has been updated, or a line of code has been updated from a code file, or other update-related information) or other source code file-related information.

The software-development automation service platform may be a Continuous Integration/Continuous Deployment (CI/CD) platform that indicates a pipeline of tasks, builds, and other related steps associated with building, testing, and deploying code (e.g., software applications). For example, the software-development automation service platform may provide update-information related to software-development pipeline features, such as indicating a stage of a build (e.g., current stage of a software application), a timeline of a software application and the stages involved in developing a software application, successes or failures of a build, or other workflow or software-development pipeline features.

A software-module application hosted on second server 206b may receive update-information related to the software-development automation service platform and transmit such update-information to the software error processing platform to determine a context of the error. For example, the context may refer to which automation pipeline feature is experiencing an error, what systems or platforms may be involved with the error, a time at which the error occurred, an update to a system/platform, log file information (e.g., AWS log data, Jenkins log data), a domain in which the error is occurring (e.g., a gear update, a pipeline update, a source code file update), or other information that provides contextual information associated with the error. The software-module application may additionally retrieve one or more error-related messages from the software-version-controlled repository that may indicate an update to a source code file and transmit such error-related messages to the software processing platform. For example, the error-related messages may be a source code file that was recently updated, a line of code that has been updated, console log information, infrastructure monitoring information, metadata, or other source code file-related messages that may be associated with the error. The software processing platform may be associated with a machine learning model configured to take as input the context of the error and the set of error-related messages to generate a prediction indicating a resolution to the error. API 204 may retrieve the prediction and generate for display a user interface (e.g., user interface 100 (FIG. 1)) such that API 204 may provide the user interface to be displayed on client device 202 (e.g., via another software-module application hosted on client device 202). In this way, computationally expensive processes may be offloaded from a client/user device, thereby reducing the amount of computational resources expended while providing predictions of resolutions to unknown computational errors.

Figure 3:
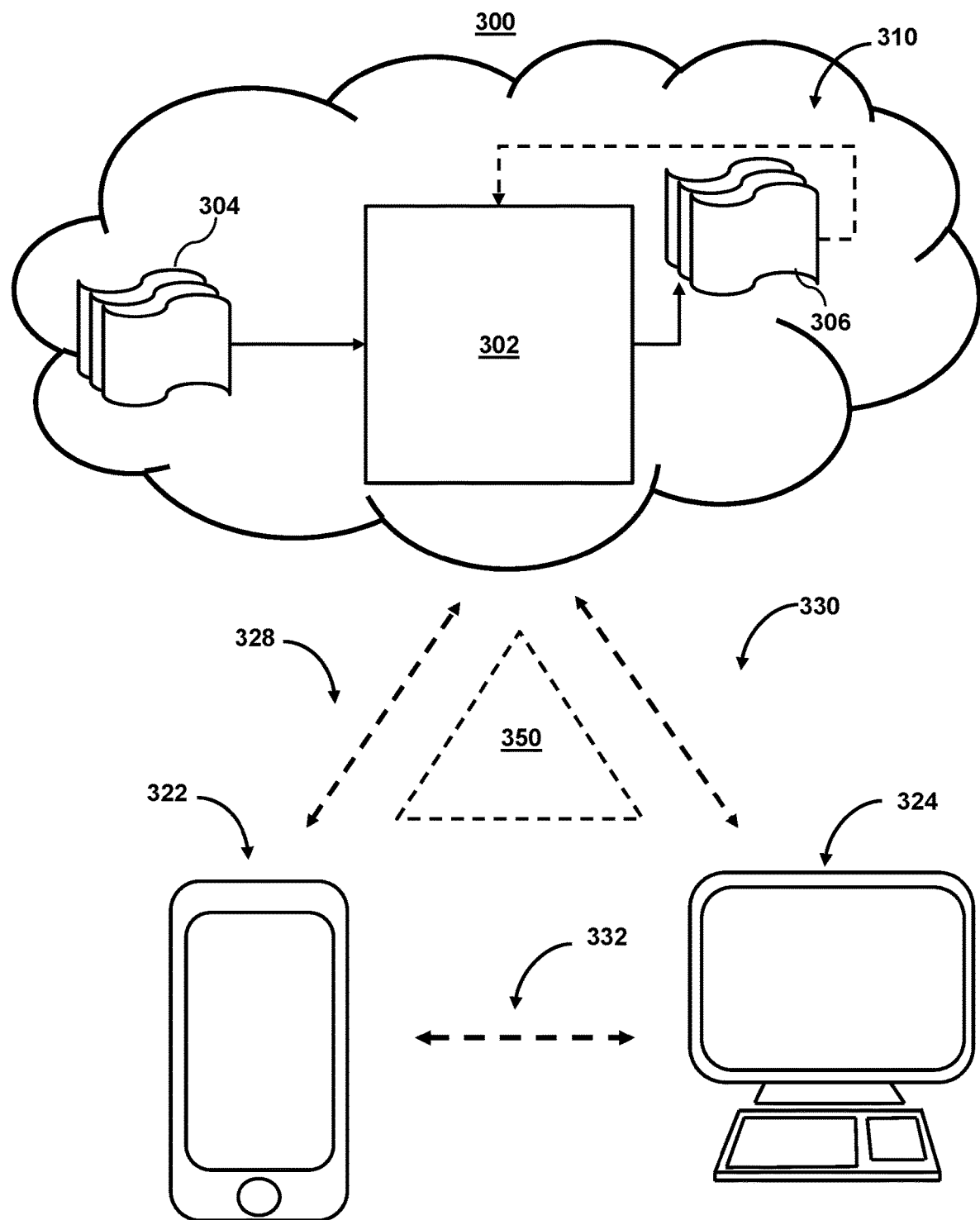
FIG. 3 shows illustrative components for a system used to reduce utilization of computational resources associated with providing predictions of resolutions to unknown computational errors via context-based historically derived resolutions to known errors, in accordance with one or more embodiments.

FIG. 3 shows illustrative components for a system used to reduce utilization of computational resources associated with providing predictions of resolutions to unknown computational errors via context-based historically derived resolutions to known errors. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a handheld computer, and other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., user interfaces, predictions to known or unknown errors, interactive links to source code files, source code file-related information, error-related information, update-information, or other information).

Additionally, as mobile device 322 and user terminal 324 are shown as touchscreen smartphones and computers, these displays also act as user input interfaces. It should be noted that in some embodiments, the devices may have neither user input interfaces nor displays, and they may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include one or more components of FIG. 2. In some embodiments, cloud components 310 may represent a remote computing network (e.g., remote from mobile device 322 or user terminal 324). For example, cloud components 310 may include first server 206a, second server 206b, third server 206c, first database 208a, second database 208b, third database 208c, or other components of FIG. 2. Cloud components 310 may access one or more remote databases. For example, cloud components 310 may access various databases, such as training data databases, system data databases, software-development platform databases, or other databases. For instance, a training data database may be a database configured to store training data for one or more machine learning models, in accordance with one or more embodiments. Training data may include labeled training data associated with resolutions to errors, such as source code files, source code file identifiers, errors, indicators of errors, resolutions to errors, text associated with resolutions to errors, contextual information, messages, update-information, or other information. A system data database may be a database configured to store system information. For example, the system information may include content associated with software development, such as messages, graphical components, images, videos, multimedia, historically resolved errors, historical errors, addresses associated with remote computing networks, addresses associated with directories within remote computing platforms or systems, identifiers, or other system information. A software-development platform database may be a database that is associated with a given software-development platform. For example, for each software-development platform (or remote computing network) system 300 interacts with, each remote computing network may include its own database. For instance, each respective database of a given software-development platform may be accessible via one or more APIs associated with the given software-development platform to enable system 300 to obtain information from it. In one use case, where a given software-development platform is a software-version-controlled repository, the software-version-controlled repository may include a database that stores one or more source code files. As another use case, where a given software-development platform is a software-development automation service platform, the software-development automation service platform may include a database that stores one or more software-development automation pipeline features for a software-development pipeline service.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. For example, the inputs may include update-information, messages related to an error, identifiers of an automation pipeline feature, a context associated with the automation pipeline feature, or other information. The outputs may include resolutions to errors, predicted resolutions to errors, an indication of a resolution to an error, or other error-related information. In some embodiments, outputs 306 may be fed back to model 302 as input to train model 302 (e.g., alone or in conjunction with user indications of the accuracy of outputs 306, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., errors, resolutions to errors, or other error-related information).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem-solving as compared to traditional computer programs. During training, an output layer of model 302 may correspond to a classification of model 302, and an input known to correspond to that classification may be input into an input layer of model 302 during training. During testing, an input without a known classification may be input into the input layer and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., errors, resolution to errors, or other error-related information).

In some embodiments, the model (e.g., model 302) may automatically perform actions based on outputs 306. In some embodiments, the model (e.g., model 302) may not perform any actions. The output of the model (e.g., model 302) may be used to generate messages, generate interactive links (e.g., to a resolution of an error, to a source code file to be updated, to an automation pipeline feature, to a software-development platform), generate error details (e.g., information related to an error, modified information indicating a resolution to an error), generate status details (e.g., information related to a status of a process, build, or stage or to other status-related details), or generate other actions, in accordance with one or more embodiments.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. In some embodiments, API layer 350 may be the same or similar to API 204 (FIG. 2). API layer 350 (which may be a REST or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer where microservices reside. In this kind of architecture, the role of API layer

350 may provide integration between front-end and back-end layers. In such cases, API layer 350 may use RESTful APIs (exposition to front-end layer or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDOS protection, and API layer 350 may use RESTful APIs as standard for external integration.

Figure 4:
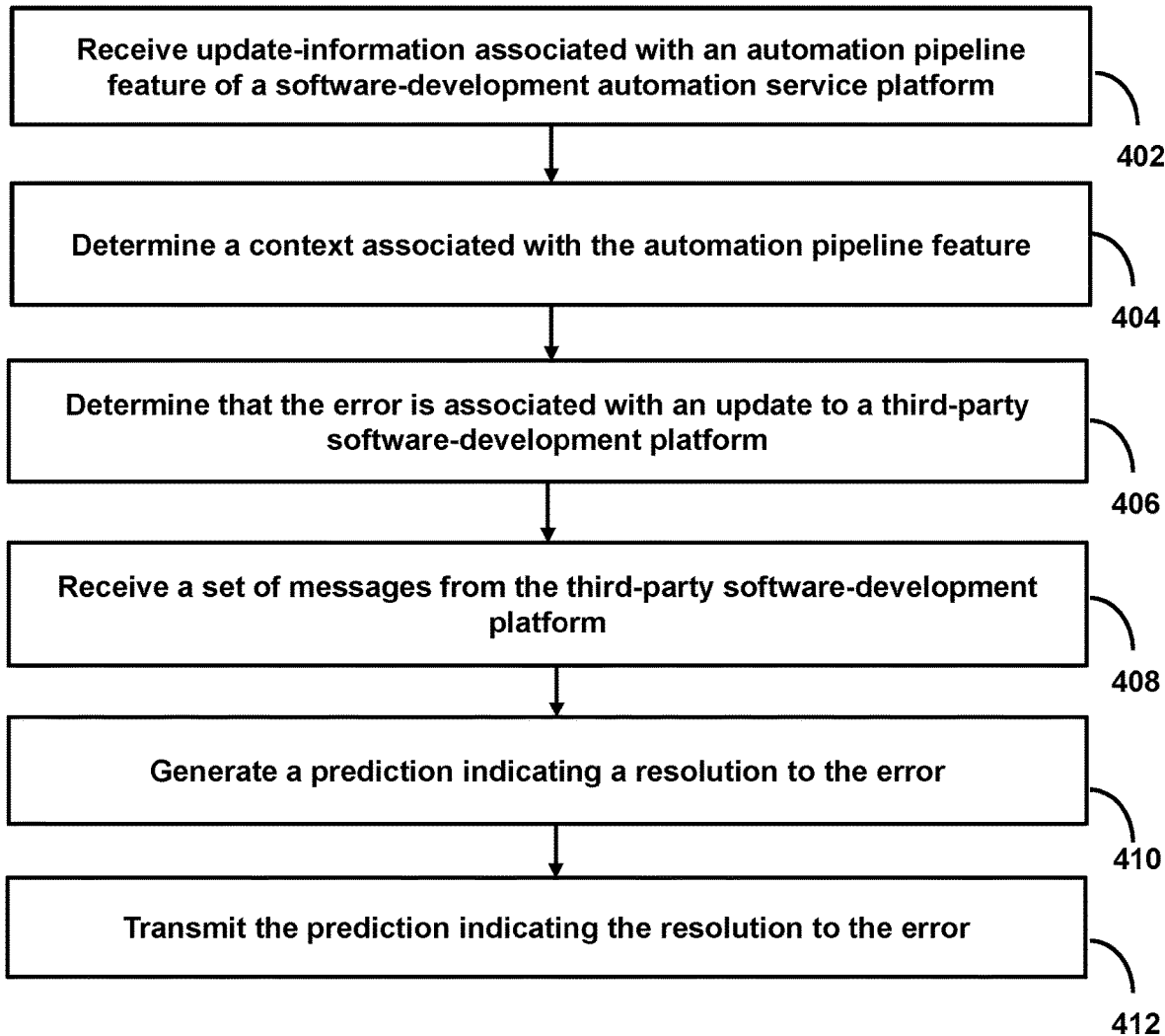
FIG. 4 shows a flowchart of the steps involved in reducing utilization of computational resources associated with providing predictions of resolutions to unknown computational errors via context-based historically derived resolutions to known errors, in accordance with one or more embodiments.

FIG. 4 shows a flowchart of the steps involved in reducing utilization of computational resources associated with providing predictions of resolutions to unknown computational errors via context-based historically derived resolutions to known errors, in accordance with one or more embodiments. For example, the system may use process 400 (e.g., as implemented on one or more system components described above) in order to provide predictions of resolutions to unknown computational errors.

At step 402, process 400 (e.g., using one or more components described above) may receive update-information associated with an automation pipeline feature of a software-development automation service platform. For example, the system may receive update-information from a CI/CD platform where the update-information indicates an error related to the automation pipeline feature. As another example, the software-development automation service platform may be a workflow service that automates tasks with respect to developing software applications (e.g., Jenkins, CloudBees, Azure DevOps Server, or other CI/CD services/platforms). Such software-development automation service platforms may provide users with a workflow (e.g., a pipeline) indicating a lifecycle of software applications that enable software developers to continually build, test, and push software application updates to other users quickly and efficiently when software-development teams are large and robust. Such software-development automation service platforms may automatically release software developer changes to the other users (e.g., clients, end users) to provide the other users with the most up-to-date software applications.

The update-information may include one or more messages indicating statuses of builds, jobs, or processes associated with the software-development automation service platform such as a build status (e.g., in progress, failed, okay, etc.), whether an error has occurred with respect to a build, job, or process (e.g., unknown error, standby ASG error, empty file error, gear depreciation error, known error), logging or log file information (e.g., AWS console logs, Jenkins console logs, external logging platform logs), infrastructure monitoring data, metadata, identifiers associated with the automation pipeline feature (e.g., a numerical or alphanumerical identifier that identifies a given build, job, or process), source code file update-information (e.g., an indication that a source code file has been updated with respect to a given build, job, or process), other software-development platforms associated with the software-development automation service platform that have been updated (e.g., identifiers of other software-development platforms that have provided an indication of an update), or other update-related information. The automation pipeline feature may be a given build, job, or process of the software-development automation service platform. For example, as CI/CD pipeline platforms distill integrating and deploying code into one or more builds, when an error occurs involving the build, the system may detect such error as being related to a given build. In this way, the system may detect when an error has occurred with respect to a given build, thereby improving the user experience.

Figure 5A:
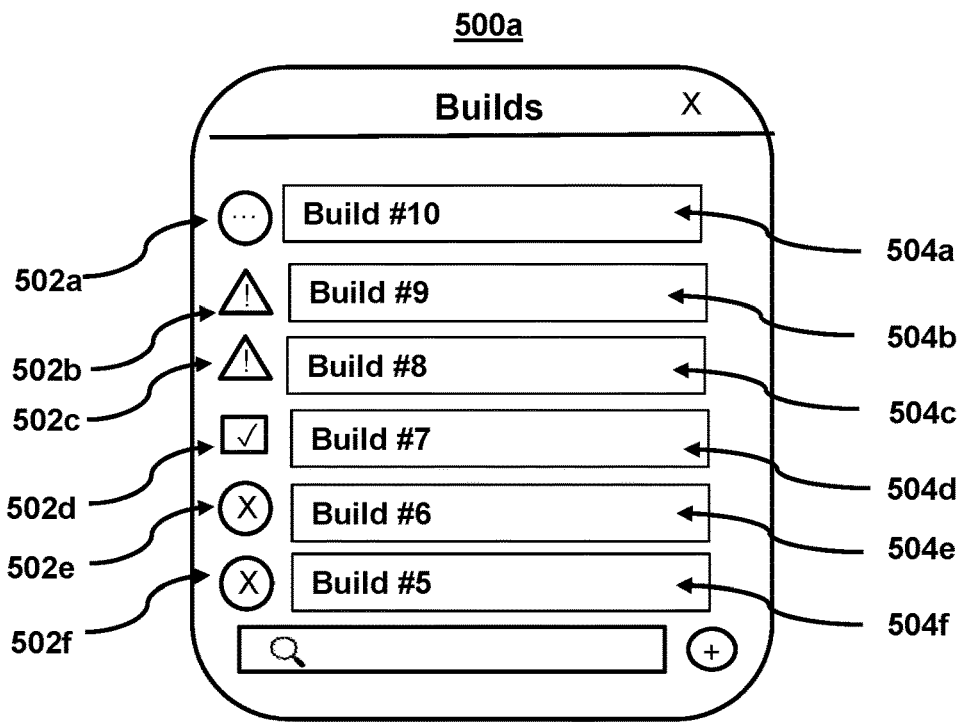

Referring to FIG. 5A, which shows an illustrative example of a user interface involved with providing predictions of resolutions to unknown computational errors, in some embodiments, the system may generate a first user interface 500*a*. For instance, using the update-information associated with the software-development automation service platform, the system may generate first user interface 500*a*, which may include visual indications 502*a*-502*f* of update-information associated with one or more software-development pipeline features 504*a*-504*f*. Visual indications 502*a*-502*f* may be generated symbols indicating the status of given software-development pipeline features associated with the software-development automation service platform. For example, the visual indications 502*a*-502*f* may visually indicate to the user whether an automation pipeline feature (e.g., a build) is in progress, is okay, is waiting, or has failed, whether an error has occurred, or whether there is another issue with the build. In this way, users may be provided with an easy-to-read, visually indicative user interface regarding statuses of one or more builds of a software-development pipeline, thereby improving the user experience.

Referring back to FIG. 4, in some embodiments, the system may determine the error related to the automation pipeline feature by performing Natural Language Processing (NLP) on the update-information. For example, the update-information may be a message or an image including a build status, logging information (e.g., console log data), cloud-based service provider-related metadata, or other information related to an update associated with an automation pipeline feature of the software-development automation service platform. The update-information may be received by a third-party software-development platform (e.g., GitHub, Jenkins, etc.) or a cloud-based service provider associated with the software-development automation service platform (e.g., AWS, Azure, etc.). The system may receive the update-information and perform NLP on the update-information to determine an error (e.g., whether known or unknown) in the update-information. For instance, as update-information may include valuable information as to whether a given build has failed, performing NLP on the update-information may extract an indication that an error has occurred (e.g., a runtime error, build error, failed build, permission denied for S3, etc.). In this way, the system may determine whether an error exists within the update-information, thereby reducing the amount of computer processing and memory resources utilized processing update-information that may not include an error.

In one use case, where the update-information includes a build status of a software-development automation service platform, the system may perform NLP on the update-information to determine whether a build has failed, is in progress, is in testing, is deploying, or has another status related to developing a software application. In response to performing the NLP, the system may determine whether the update-information indicates an error (e.g., a failed build status) to confirm that the update-information includes an indication of an error as opposed to another update status.

At step 404, process 400 (e.g., using one or more components described above) may determine a context associated with the automation pipeline feature. For example, based on the update-information, the system may determine a context associated with the automation pipeline feature.

The context may be information that forms the setting or circumstances for why an error has occurred. For instance, the context may be the update-information or information derived from the update-information. For example, the context may be an identifier associated with a build, a time at which the error occurred, whether a network infrastructure component was online or offline (e.g., a given software-development platform was offline for system updates), which software-development platforms are involved with the error (e.g., identifiers indicating software-development platforms that are communicatively connected to the system, CI/CD platform, or API), an error identifier (e.g., unknown error identifier, a known error identifier, etc.), log file information, or other information that provides contextual information regarding the circumstances surrounding a given error.

When determining resolutions to unknown errors (or other errors), such errors may not have previously occurred or have been solved. The contextual information provides additional information that may help determine the root cause or a resolution to the error. Namely, in circumstances where the error is an unknown error, as the error has not yet been identified (or may not have previously occurred), additional information may be required to determine the cause of the error or how to fix the error. As opposed to an existing system's reliance on hard-coded errors (and the causes thereof), there is no mechanism for determining a resolution to an unknown error. In this way, by deriving contextual information regarding an unknown (or known) error, the system may provide resolutions to unknown errors.

In some embodiments, the system may determine a context associated with the automation pipeline feature based on an identifier. For example, the system may extract an identifier from the update-information that identifies the automation pipeline feature. For instance, where the update-information includes a console log indicating an error with "Build 2," the system may extract the automation pipeline feature identifier (e.g., "Build 2") to provide context as to which automation pipeline feature or other software-development-related processes may be experiencing an error. In this way, the system may provide a context as to which software-development process of a software-development pipeline is experiencing an error, narrowing down the possible software-development-related processes to focus on among a plurality of software-development-related processes, thereby reducing the amount of computer processing and computer memory resources utilized when determining resolutions to errors.

In some embodiments, the context associated with the automation pipeline feature may be determined based on a set of software-development-related resources. For example, as multiple platforms are used to continually integrate or continually develop code for software applications, such platforms may interact with a software-development automation service platform, providing information such as source code files, access to one or more databases, policy information, security information, or other information used when continuously integrating or deploying software applications. As each of these resources (e.g., platforms) interact with the software-development automation service platform, it is valuable to know which platforms are associated with a given build that is experiencing an error (or unknown error). As such, the system may extract an identifier from the update-information to identify the automation pipeline feature. Based on the identifier, the system may determine a set of software-development-related resources (e.g., other platforms that are connected to, or otherwise used by, the software-development automation service platform) that are used in connection with the automation pipeline feature.

For example, where the automation pipeline feature is "Build 2," the system may determine (e.g., by accessing a database mapping build identifiers to platforms associated with the build, by performing NLP on the update-information, etc.) which software-development-related resources or platforms are used to complete or execute "Build 2." In response to determining the software-development-related resources associated with "Build 2," the system may determine the context associated with the automation pipeline feature (e.g., "Build 2") using the set of software-development-related resources. For instance, the set of software-development-related resources may provide contextual information associated with the current error (whether known or unknown). In this way, the system may determine valuable contextual information related to an error, thereby improving accurate generation of resolutions to the error.

In some embodiments, the context associated with the automation pipeline feature may be based on a timestamp. For example, timestamp information indicating the time at which the automation pipeline feature was received may prove useful for determining an error associated with the automation pipeline feature. For example, the system may extract a timestamp associated with the update-information that indicates a time at which the update-information was received. The timestamp may be used to narrow down a particular error associated with the automation pipeline feature.

In some embodiments, the system may use the extracted timestamp to determine whether one or more software-development-related resources were disconnected from the software-development automation service platform. For instance, one or more databases or other resources that were down (e.g., for maintenance) or otherwise unavailable at the time at which the update-information indicating an error was received may indicate a potential cause of the error. As such, the timestamp information associated with when the update-information was received may provide further context as to what may be causing an error, thereby reducing the amount of computer processing and memory resources used to determine a resolution to an error by narrowing down potential causes of the error based on time.

At step 406, process 400 (e.g., using one or more components described above) may determine that the error is associated with an update to a third-party software-development platform. For example, the software-development automation service platform may work together with a third-party software-development platform, such as a software-version-controlled repository, when developing a software application. When the software-development automation service platform, such as a CI/CD platform, executes or runs a given build, job, or other process, the CI/CD platform may use source code files stored at a software-version-controlled repository and/or other code files associated with the software-development automation service platform (e.g., Bogie files, Jenkins files, log files, console log files, infrastructure monitoring data, etc.). When determining resolutions to unknown (or known) errors, the system may determine whether a given error (e.g., as indicated via the software-development automation service platform) is associated with an update to a software-version-controlled repository (or the source code files stored in the software-version-controlled repository).

For instance, when a source code file is updated, the software-version-controlled repository may provide an indication that one or more source code files have been updated (e.g., via a notification, message, or other information). The software-development automation service platform may be notified of such indication via an API (e.g., API 204) or, alternatively, a software-module application hosted by the software-development automation service platform. An update to one or more source code files may be valuable information as to where or what caused the error at hand. In this way, the system may determine whether a given source code file or other update to the software-version-controlled repository is associated with the error, thereby providing further contextual information to generate accurate and robust predicted resolutions to unknown errors.

In some embodiments, the system may determine whether the error is associated with an update to a third-party software-development platform based on time. For example, the system may extract a timestamp associated with the update-information indicating the time at which the update-information was received. As the third-party software-development platform may be communicatively connected to the system, the system may receive notifications, messages, or other information regarding whether the third-party software-development platform has been updated or if one or more files hosted on the third-party software-development platform have been edited.

The system may then determine whether the third-party software-development platform indicates a status change within a threshold time period of the timestamp associated with the update-information. For example, where a software-version-controlled repository has one or more source code files (e.g., for a software application) updated, the repository may transmit a message at a first time and the system may determine whether the first time is within a threshold time period (e.g., 10 seconds, 30 seconds, 1 minute, etc.). In response to the third-party software-development platform indicating a status change with the threshold time period, the system may determine that the error is associated with the update to the third-party software-development platform. In this way, the system can provide further context as to an origin of an error (or unknown error) while reducing the amount of computer processing and memory resources otherwise utilized on inaccurate sources of an error.

In some embodiments, the system may confirm whether a status change indicates an update to source code file-related information. For example, the system may perform NLP on a received message (e.g., push notification) from the third-party software-development platform to determine whether the message includes an indication of an update to a source code file. For instance, the indication of an update to a source code file may be textual information such as "code.c updated," "code.c. edited at 5:25:00 Jul. 26, 2023," or other textual information. In response to the system determining that the status change indicates an update to source code file-related information, the system may determine that the error is associated with the update to the third-party software-development platform. In this way, the system may confirm that a source code file has been changed as opposed to other notifications pushed via the third-party software-development platform, thereby reducing the amount of computer processing and memory resources wasted on processing unnecessary or inaccurate error-related information.

At step 408, process 400 (e.g., using one or more components described above) may receive a set of messages from the third-party software-development platform. For example, the system may receive, from the third-party software-development platform, a set of messages indicating source code file-related information. For example, the system may receive (e.g., via API 204 (FIG. 2) or the software-module application associated with the software-automation version-controlled platform) messages from the software-version-controlled repository that include the source code file that has been updated. As another example, the messages may include metadata associated with a web page from the software-version-controlled repository indicating an identifier of a source code file that has been updated. Additionally or alternatively, the messages may include console log information received from the software-version-controlled repository. In some embodiments, the set of messages may be a notification received from the third-party software development platform that may indicate the source code-file related information. In this way, the system may generate predictions indicating resolutions to unknown errors using source code file-related information, thereby providing additional contextual information as to what source code file may have caused an error.

At step 410, the process 400 (e.g., using one or more components described above) may generate a prediction indicating a resolution to the error. For example, the system may provide (i) the context associated with the automation pipeline feature and (ii) the set of messages indicating the source code file-related information to a machine learning model to generate a prediction indicating a resolution to the error. Additionally or alternatively, the system may further provide the identifier of the automation pipeline feature and the source code file to a machine learning model trained on context-based historically derived resolutions to errors to generate a prediction indicating a resolution to the error. In some embodiments, the resolution to the error (e.g., an unknown error) may be associated with the identifier of the automation pipeline feature. The resolution to the error may be textual information such as portions of code (e.g., source code file code snippets) to be replaced or updated in the source code of the software application, indications to update or add a value within the source code, indications to update a Bogie file, Jenkins file, or other software-development automation service platform code, or other information. The resolutions to the error may be predicted using the context-based historically derived resolutions to the errors. For example, the machine learning model may learn one or more associations between the input data to determine what portions of source code or other information previously solved a given error. In the case of unknown errors, the machine learning model leverages such associations, and in some embodiments may weigh the contextual information higher than (e.g., greater than that of) the source code file-related information to generate a prediction as to resolving the unknown error.

For example, by providing not only the source code file-related information to the machine learning model but also the contextual information related to the automation pipeline feature, the machine learning model may generate more robust and accurate predictions as to the "fix" for the error. For instance, as opposed to existing systems that solely rely on the source code itself, the contextual information may point to another underlying error that is associated with the update to the source code file. Due to the complexity of modern software applications, a missing value may be masked as a syntax error. However, as existing systems have no mechanism to use contextual information regarding what systems are being used, what code files are being updated, what libraries are being used, and what build, job, or other important console log information is being output by the console, such systems are inadequate to determine the cause of an unknown error, let alone provide a resolution to an unknown error. Accordingly, the system uses robust contextual information in conjunction with source code-related information to accurately determine resolutions to unknown, previously unseen errors. Moreover, by generating the prediction indicating a resolution to an unknown error at the software-module application hosted by the software-development automation service platform, the system may reduce the utilization of computational resources expended by the client device conventionally required to provide machine learning model-based predictions.

In some embodiments, the machine learning model may be trained based on labeled training data. For example, the system may obtain labeled training data comprising (i) a first context associated with a first automation pipeline feature, (ii) a first set of messages related to the first automation pipeline feature, (iii) an error associated with the automation pipeline feature, and (iv) a known resolution to the error associated with the automation pipeline feature. The first context may indicate contextual information related to the first automation pipeline feature, such as what time a build status failed, what platforms are associated with a build, the given build status, or other contextual information. The first set of messages may be console log information, infrastructure monitoring information, metadata, or source code file information (e.g., update-information of lines of code updated within a source code file, a compilation error, a runtime error, etc.). The error associated with the automation pipeline feature may include a known error of the build, a ground truth known error, or other verified error. The known resolution to the error may be a known cure, fix, or other resolution to the error. For instance, the known resolution to the error may be based on a threshold amount of user-provided votes, a system administrator verifying that the resolution to the error cures the given error, or other verified resolution to the error.

As such, the training data may comprise a set of ground truth information related to resolving historical unknown errors to aid in predicting resolutions to future unknown errors by context-based historically derived resolutions to such errors. Using the labeled training data, the system may provide the training data to a training routine of the machine learning model to train the machine learning model. In this way, the system provides accurate and robust predictions regarding resolutions to errors based on context-based historically derived resolutions to errors.

Figure 6:
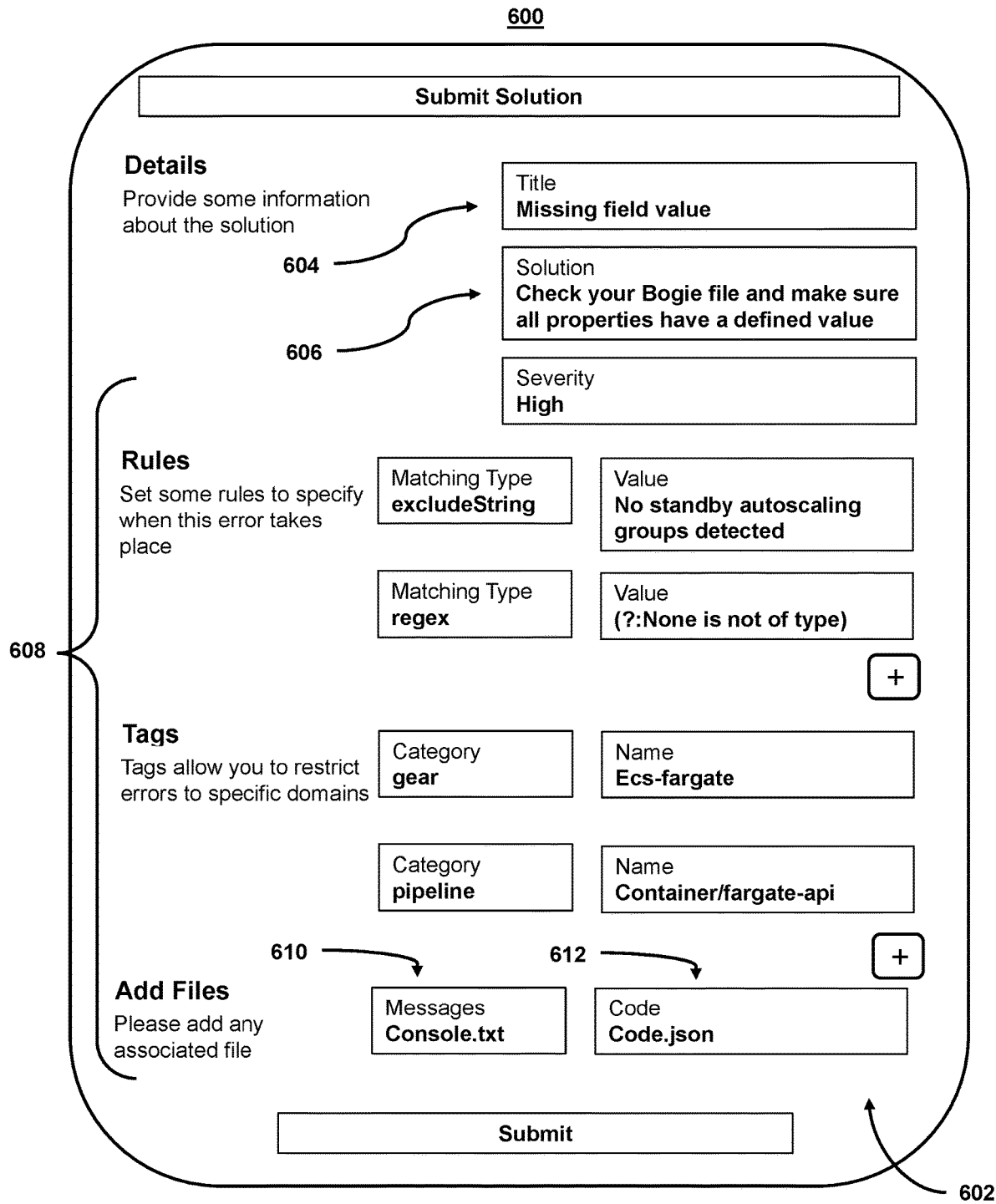
FIG. 6 shows an illustrative example of a user interface for providing a context-based resolution to an unknown error.

In some embodiments, users (e.g., software developers) may provide labeled training data. For example, referring to FIG. 6, the system may generate for display solution interface 600. Solution interface 600 may include one or more data fields 602 that enable a user to provide (i) contextual information regarding a solution to an error and (ii) messages or other code files related to resolving the error. For example, a user may input a title 604, a solution 606, and context 608 (e.g., contextual information associated with the automation pipeline feature), which may include rules, tags, messages 610 (e.g., messages associated with the software-development automation service platform, messages associated with the software-version-controlled repository, etc.), code 612 (e.g., source code file-related information, source code files, etc.), or other information. Using the user-inputted information, the system may generate labeled training data such that the machine learning model may be further updated or trained to predict the most accurate and robust resolutions to errors. Additionally or alternatively, in the case where the same error occurs in the future, the system may be configured to retrieve (e.g., from a database) such resolution to reduce the amount of computational resources that would be otherwise expended via a machine learning model-derived prediction.

Referring back to FIG. 4, in some embodiments, the system may receive second update-information associated with the automation pipeline feature. For example, subsequent to employing the predicted resolution to the error, the software-development automation service platform may provide a new update. The new update may indicate that there are no current errors (or that the previous error has been resolved). As such, the system may update the machine learning model in response to the new update, indicating that there is no current error using updated training information based on the prior error. The updated training information may include (i) the context associated with the automation pipeline feature, (ii) the set of messages, and (iii) the resolution to the error. In this way, the system provides better predictions regarding unknown, future errors by automatically updating the model in response to an error being resolved.

In some embodiments, the system may receive a user confirmation that the predicted resolution to the error resulted in the error being resolved or fixed. For example, the user may be provided with the predicted resolution to the error and upon the user employing (e.g., using) the predicted resolution to the error, the error may be resolved upon an update to one or more source code files of the software-development automation service platform. As such, the user may confirm that the predicted resolution to the error resulted in the error being resolved. In response to the user confirmation, and prior to updating the machine learning model, the system may update the training data with updated information comprising at least (i) the context associated with the automation pipeline feature, (ii) the set of messages, and (iii) the resolution to the error (e.g., the prior predicted resolution to the error). The system may then update the machine learning model by retraining the machine learning model by using the updated training data. In this way, the system provides better predictions regarding unknown, future errors by updating the training information in response to the error being resolved.

At step 412, process 400 (e.g., using one or more components described above) may transmit the prediction indicating a resolution to the error. For example, the system may transmit the prediction indicating the resolution to the error to another software-module application installed on a remote client device (e.g., user device). For example, transmitting the prediction indicating the resolution to the error may enable the remote client device to generate for display the prediction indicating the resolution to the error on a user interface associated with the remote client device (e.g., to enable a software developer to see how to fix the error). As an example, the system may transmit the prediction from the software-module application (e.g., part of the software automation service platform) to the software-module application installed on the remote client device (e.g., a plug-in, web browser, web browser plug-in, etc.), thereby offloading computationally expensive processes (e.g., machine learning model-related processes) to remote devices as opposed to client or end-user devices.

In some embodiments, the system may transmit modified information to the software-module application. For example, to provide users with useful information regarding an error, the system may generate a message to be transmitted to the software-module application that includes (i) the resolution to the error, (ii) the update-information associated with the automation pipeline feature, and (iii) the source code file. For instance, the message may include identifying information of the error (e.g., what error is currently affecting the system), the source code file (or a portion thereof) that is causing the error (or an interactive link, such as a web link, that enables the user to view the source code file), and how to fix the error at hand. In this way, the system not only improves the user experience but also reduces software application downtime caused by errors as resolutions to such errors may be employed quickly.

Figure 5B:
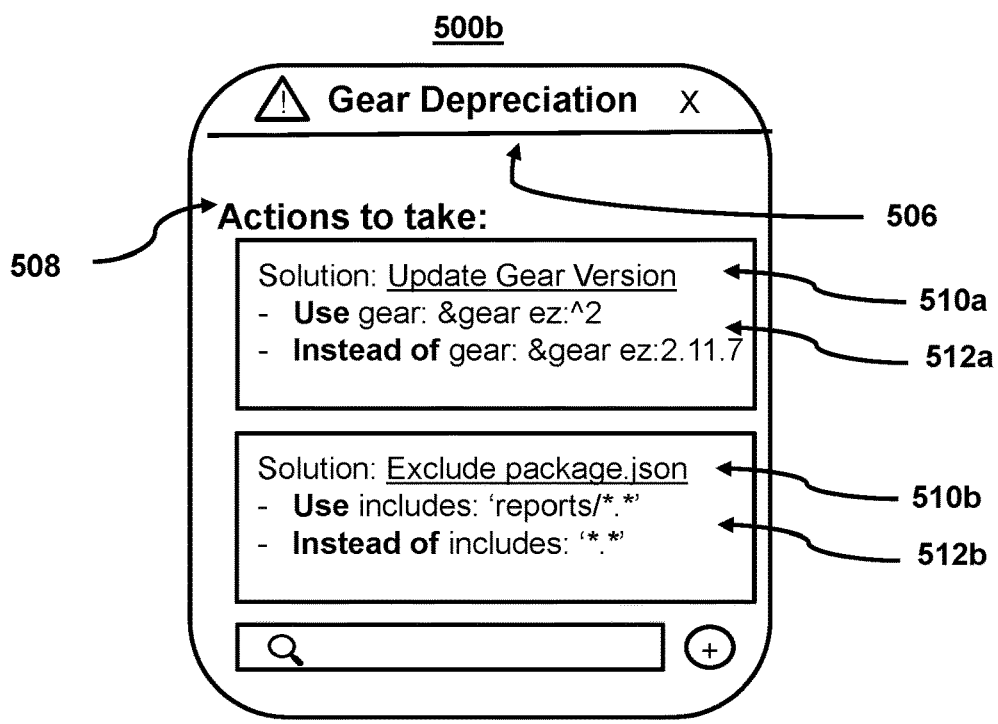

As an example, referring to FIG. 5B showing another illustrative example of a user interface involved with providing predictions of resolutions to unknown computational errors, the system may generate a second user interface 500b using information related to the prediction to the error. For instance, second user interface 500b may provide an indication of the error 506 and the predicted resolution to the error 508, which may include interactive links to source code files 510a-510b and textual information regarding portions of code 512a-512b that may be employed to resolve the error. The interactive links to source code files 510a-510b may be a hyperlink associated with an address to a location of the indicated source code file within a software-version-controlled repository. For instance, a user (e.g., software developer) may click on the interactive link 510a, and the source code file associated with the interactive link 510a may be generated for display within second user interface 500b. Additionally, the portions of code 512a-512b may be generated based on the prediction of the resolution to the unknown error. For instance, while the prediction of the resolution to the error may include a plethora of information, the system may generate a modified message including only a portion of the predicted resolution to the error, thereby improving the user experience as the user is provided with the most important information regarding the resolution to the error.

As another example, referring to FIG. 5C, showing yet another illustrative example of a user interface involved with providing predictions of resolutions to unknown computational errors, the system may generate a third user interface 500c. For example, the system may, in response to a user clicking an interactive link to a source code file, generate for display third user interface 500c. The third user interface 500c may include an overview of the error-related information 514, such as the errors being experienced by the automation pipeline feature and the predicted resolution to the error. Where a user interacts with an interactive link associated with a predicted resolution to an error, the system may generate for display the source code file 516. The source code file 516 may be provided to enable the user (e.g., software developer) to make or otherwise edit one or more portions of the source code file. In some embodiments, by interacting with the interactive link (e.g., by clicking on the link), the system may autofill the predicted resolution to the error within the source code file, thereby improving the user experience as the predicted resolution to the error is automatically employed.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims, which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving update-information associated with an automation pipeline feature of a software-development automation service platform, the update-information indicating an error related to the automation pipeline feature; determining, based on the update-information, a context associated with the automation pipeline feature; determining, based on the error, that the error is associated with an update to a third-party software-development platform associated with the software-development automation service platform; receiving, from the third-party software-development platform, a set of messages, wherein the set of messages indicates source code file-related information; providing (i) the context associated with the automation pipeline feature and (ii) the set of messages indicating the source code file-related information to a machine learning model to generate a prediction indicating a resolution to the error; and transmitting, to a software-module application installed on a remote client device, the prediction indicating the resolution to the error.

2. The method of any one of the preceding embodiments, further comprising: performing Natural Language Processing (NLP) on the update-information to determine the error indicated in the update-information.

3. The method of any one of the preceding embodiments, wherein determining the context associated with the automation pipeline feature further comprises: extracting an identifier identifying the automation pipeline feature using the update-information; and determining, based on the identifier, the context associated with the automation pipeline feature.

4. The method of any one of the preceding embodiments, wherein determining the context associated with the automation pipeline feature further comprises: extracting an identifier identifying the automation pipeline feature using the update-information; determining, based on the identifier, a set of software-development-related resources associated with the automation pipeline feature, wherein the set of software-development-related resources is connected to the software-development automation service platform; and determining the context associated with the automation pipeline feature based on the set of software-development-related resources.

5. The method of any one of the preceding embodiments, wherein determining the context associated with the automation pipeline feature further comprises: extracting a timestamp associated with the update-information, wherein the timestamp indicates a time at which the update-information was received; and determining, based on the timestamp, the context associated with the automation pipeline feature.
6. The method of any one of the preceding embodiments, wherein determining that the error is associated with the update to the third-party software-development platform further comprises: extracting a timestamp associated with the update-information, wherein the timestamp indicates a time at which the update-information was received; determining that the third-party software-development platform indicates a status change within a threshold time period of the timestamp associated with the update-information; and in response to the third-party software-development platform indicating the status change within the threshold time period of the timestamp associated with the update-information, determining that the error is associated with the update to the third-party software-development platform.
7. The method of the preceding embodiment, further comprising: determining that the status change indicates an update to source code file-related information; and in response to determining that the status change indicates the update to the source code file-related information, determining that the error is associated with the update to the third-party software-development platform.
8. The method of any one of the preceding embodiments, wherein the set of messages comprise console log information, infrastructure monitoring information, metadata, or source code file update-information.
9. The method of any one of the preceding embodiments, further comprising: obtaining training data comprising (i) a first context associated with a first automation pipeline feature, (ii) a first set of messages related to the first automation pipeline feature, (iii) a first error associated with the first automation pipeline feature, and (iv) a known resolution to the first error associated with the first automation pipeline feature; and providing the training data to a training routine of the machine learning model to train the machine learning model.
10. The method of any one of the preceding embodiments, further comprising: in response to receiving second update-information associated with the automation pipeline feature indicating a lack of error as a result of employing the resolution to the error, updating the machine learning model using updated training data comprising (i) the context associated with the automation pipeline feature, (ii) the set of messages, and (iii) the predicted resolution to the error.
11. The method of the preceding embodiment, further comprising: receiving a user confirmation from a user indicating that the predicted resolution to the error resulted in the error being resolved; in response to the user confirmation and prior to updating the machine learning model, updating the training data with updated information comprising at least (i) the context associated with the automation pipeline feature, (ii) the set of messages, and (iii) the predicted resolution to the error; and in response to updating the training data, updating the machine learning model.
12. The method of any one of the preceding embodiments, wherein the software-module application installed on the remote client device is a plug-in application configured to receive information indicating the resolution to the error.
13. The method of any one of the preceding embodiments, further comprising: generating a message comprising modified information of (i) the resolution to the error, (ii) the update-information associated with the automation pipeline feature, and (iii) the source code file-related information; and transmitting the modified information to the software-module application installed on the remote client device.
14. A tangible, non-transitory, machine-readable medium storing instructions that, when executed by a data processing apparatus, cause the data processing apparatus to perform operations comprising those of any of embodiments 1-13.
15. A system comprising one or more processors; and memory storing instructions that, when executed by the processors, cause the processors to effectuate operations comprising those of any of embodiments 1-13.
16. A system comprising means for performing any of embodiments 1-13.

What is claimed is:
1. A system for reducing utilization of computational resources associated with providing predictions of resolutions to unknown computational errors via context-based historically derived resolutions to known errors, the system comprising:
one or more processors executing computer program instructions that, when executed, cause operations comprising:
receiving a first message indicating update-information associated with an automation pipeline feature of a set of automation pipeline features associated with a software-development automation service platform, the update-information indicating an unknown error related to the automation pipeline feature;
extracting, from the update-information, an identifier of the automation pipeline feature, wherein the identifier indicates a software automation build associated with the unknown error;
based on the unknown error being associated with an update to a source code file stored at a third-party software-version-controlled repository, retrieving, from the third-party software-version-controlled repository, the source code file;
providing (i) the update-information indicating the unknown error related to the automation pipeline feature, (ii) the identifier of the automation pipeline feature, and (iii) the source code file to a machine learning model trained on context-based historically derived resolutions to errors to generate a prediction indicating a resolution to the unknown error, wherein the resolution to the unknown error is associated with the identifier of the automation pipeline feature;
generating a second message comprising modified information of (i) the resolution to the unknown error, (ii) the update-information associated with the automation pipeline feature, and (iii) the source code file; and
transmitting the second message to a remote client device to enable the remote client device to generate for display the second message at a user interface associated with the remote client device.
2. A method for reducing utilization of computational resources associated with providing predictions of resolutions to unknown computational errors via context-based historically derived resolutions to known errors, the method comprising:
receiving update-information associated with an automation pipeline feature of a software-development auto- mation service platform, the update-information indicating an error related to the automation pipeline feature;
extracting, based on the update-information, a context associated with the automation pipeline feature;
based on the error being associated with an update to a third-party software-development platform associated with the software-development automation service platform, receiving, from the third-party software-development platform, a set of messages, wherein the set of messages indicates source code file-related information;
providing (i) the context associated with the automation pipeline feature and (ii) the set of messages indicating the source code file-related information to a machine learning model to generate a prediction indicating a resolution to the error; and
transmitting, to a software-module application installed on a remote client device, the prediction indicating the resolution to the error.

3. The method of claim 2, further comprising:
performing Natural Language Processing (NLP) on the update-information to determine the error indicated in the update-information.

4. The method of claim 2, wherein extracting the context associated with the automation pipeline feature further comprises:
extracting an identifier identifying the automation pipeline feature from the update-information; and
using the identifier as the context associated with the automation pipeline feature.

5. The method of claim 2, wherein extracting the context associated with the automation pipeline feature further comprises:
extracting an identifier identifying the automation pipeline feature from the update-information;
determining, based on the identifier, a set of software-development-related resources associated with the automation pipeline feature, wherein the set of software-development-related resources is connected to the software-development automation service platform; and
extracting the context associated with the automation pipeline feature based on the set of software-development-related resources.

6. The method of claim 2, wherein extracting the context associated with the automation pipeline feature further comprises:
extracting a timestamp associated with the update-information, wherein the timestamp indicates a time at which the update-information was received; and
using the timestamp as the context associated with the automation pipeline feature.

7. The method of claim 2, further comprising:
extracting a timestamp associated with the update-information, wherein the timestamp indicates a time at which the update-information was received;
determining that the third-party software-development platform indicates a status change within a threshold time period of the timestamp associated with the update-information; and
in response to the third-party software-development platform indicating the status change within the threshold time period of the timestamp associated with the update-information, determining that the error is associated with the update to the third-party software-development platform.

8. The method of claim 7, further comprising:
determining that the status change indicates an update to source code file-related information; and
in response to determining that the status change indicates the update to the source code file-related information, determining that the error is associated with the update to the third-party software-development platform.

9. The method of claim 2, wherein the set of messages comprise console log information, infrastructure monitoring information, metadata, or source code file update-information.

10. The method of claim 2, further comprising:
obtaining training data comprising (i) a first context associated with a first automation pipeline feature, (ii) a first set of messages related to the first automation pipeline feature, (iii) a first error associated with the first automation pipeline feature, and (iv) a known resolution to the first error associated with the first automation pipeline feature; and
providing the training data to a training routine of the machine learning model to train the machine learning model.

11. The method of claim 2, further comprising:
in response to receiving second update-information associated with the automation pipeline feature indicating a lack of error as a result of employing the resolution to the error, updating the machine learning model using updated training data comprising (i) the context associated with the automation pipeline feature, (ii) the set of messages, and (iii) the prediction indicating the resolution to the error.

12. The method of claim 11, further comprising:
receiving a user confirmation from a user indicating that the prediction indicating the resolution to the error resulted in the error being resolved;
in response to the user confirmation and prior to updating the machine learning model, updating the training data with updated information comprising at least (i) the context associated with the automation pipeline feature, (ii) the set of messages, and (iii) the prediction indicating the resolution to the error; and
in response to updating the training data, updating the machine learning model.

13. The method of claim 2, wherein the software-module application installed on the remote client device is a plug-in application configured to receive information indicating the resolution to the error.

14. The method of claim 2, further comprising:
generating a message comprising modified information of (i) the resolution to the error, (ii) the update-information associated with the automation pipeline feature, and (iii) the source code file-related information; and
transmitting the modified information to the software-module application installed on the remote client device.

15. One or more non-transitory, computer-readable media comprising instructions that, when executed by one or more processors, cause operations comprising:
receiving update-information associated with an automation pipeline feature of a software-development automation service platform, the update-information indicating an error related to the automation pipeline feature;
extracting, based on the update-information, a context associated with the automation pipeline feature;
based on the error being associated with an update to a third-party software-development platform associated with the software-development automation service platform, receiving, from the third-party software-development platform, a set of messages, wherein the set of messages indicates source code file-related information;

providing (i) the context associated with the automation pipeline feature and (ii) the set of messages indicating the source code file-related information to a machine learning model to generate a prediction indicating a resolution to the error; and transmitting, to a software-module application installed on a remote client device, the prediction indicating the resolution to the error.

16. The non-transitory, computer-readable media of claim 15, wherein the instructions that, when executed by the one or more processors, cause operations further comprising:

obtaining training data comprising (i) a first context associated with a first automation pipeline feature, (ii) a first set of messages related to the first automation pipeline feature, (iii) a first error associated with the first automation pipeline feature, and (iv) a known resolution to the first error associated with the first automation pipeline feature; and providing the training data to a training routine of the machine learning model to train the machine learning model.

17. The non-transitory, computer-readable media of claim 15, wherein the instructions that, when executed by the one or more processors, cause operations further comprising:

in response to receiving second update-information associated with the automation pipeline feature indicating a lack of error as a result of employing the resolution to the error, updating the machine learning model using updated training data comprising (i) the context associated with the automation pipeline feature, (ii) the set of messages, and (iii) the prediction indicating the resolution to the error.

18. The non-transitory, computer-readable media of claim 15, wherein the software-module application installed on the remote client device is a plug-in application configured to receive information indicating the resolution to the error.

19. The non-transitory, computer-readable media of claim 15, wherein the instructions that, when executed by the one or more processors, cause operations further comprising:

generating a message comprising modified information of (i) the resolution to the error, (ii) the update-information associated with the automation pipeline feature, and (iii) the source code file-related information; and transmitting the modified information to the software-module application installed on the remote client device.

20. The non-transitory, computer-readable media of claim 15, wherein extracting the context associated with the automation pipeline feature further comprises:

extracting an identifier identifying the automation pipeline feature from the update-information; and using the identifier as the context associated with the automation pipeline feature.

* * * * *